June 24, 1969     J. R. COLLINS     3,451,396
APPARATUS AND METHOD FOR TRIMMING ANIMAL EARS
Filed May 13, 1965
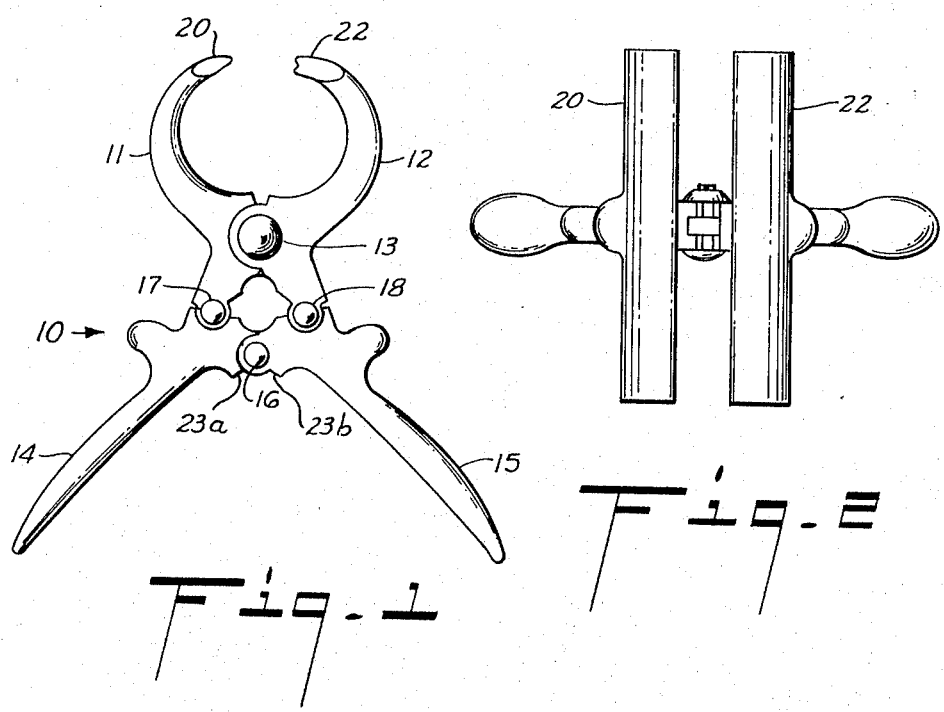
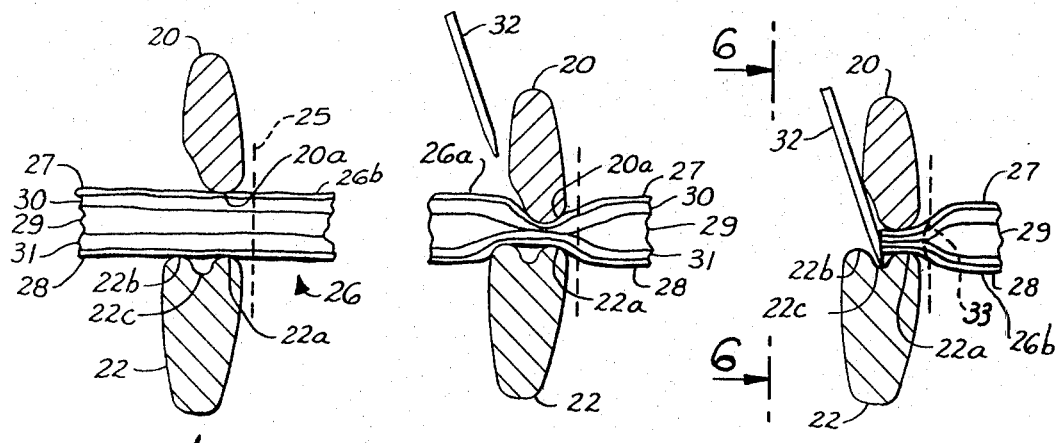
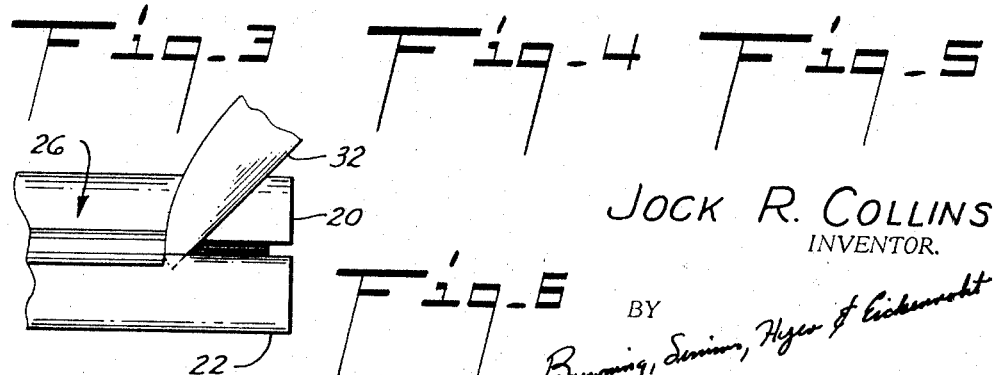
JOCK R. COLLINS
INVENTOR.
BY
ATTORNEYS

United States Patent Office 3,451,396
Patented June 24, 1969

3,451,396
APPARATUS AND METHOD FOR TRIMMING ANIMAL EARS
Jock R. Collins, 1528 S. Post Oak Road,
Houston, Tex. 77027
Filed May 13, 1965, Ser. No. 455,408
Int. Cl. A61b 17/32
U.S. Cl. 128—305      4 Claims

ABSTRACT OF THE DISCLOSURE

A method of and apparatus for trimming animal ears by first crushing the ear along the line of the trim is disclosed. The apparatus includes pinchers having rounded convex elongated jaws. Pressure, applied to the rounded jaws, squeezes the ear between them sufficiently to sever the inner cartilage and crush the blood vessels located between the cartilage and the outer skin of the ear. The unwanted portion of the ear is then cut away, with the incision being located just outside the line of crushed blood vessels adjacent the end of the separated cartilage. One jaw of the pinchers has a parallel, convex protrusion that forms a groove with the jaw for guiding a knife along the line of crushed blood vessels and between the severed cartilages.

---

This invention relates to apparatus for and a method of trimming animal ears.

The apparatus and method of this invention can be used to trim any animal's ears when there may be an occasion or reason to do so. This operation is performed most commonly, however, to enhance the appearance of certain breeds of dogs such as Boxers, Great Danes, and Doberman Pinschers.

When trimming the ears of such dogs, the operation has to be performed very carefully, for if the ear is not properly trimmed, it will detract rather than enhance the looks of the dog. Thus, the ear trimming operations are particularly critical when the dog is to be trained for show purposes. Heretofore, these operations included the steps of cutting off a portion of the ear along a predetermined line; very carefully cauterizing and/or tying off the blood vessels severed by the incision; and then carefully sewing together the skin on each side of the ear all along the incision to close the wound in such a manner that the edge of the healed ear would show a minimum of scar tissue. Thus, such operations, as heretofore performed, were very bloody, time consuming tedious, and difficult to perform.

Therefore, it is an object of this invention to provide an improved method of trimming the ear of an animal that is quick and easy to perform and to provide apparatus for performing said method.

It is another object of this invention to provide apparatus for and a method of trimming the ear of an animal quickly and efficiently with a minimum loss of blood to the animal.

It is another object of this invention to provide apparatus for and a method of trimming the ear of an animal that substantially reduces the stitching required for the operation.

It is yet another object of this invention to provide apparatus for and a method of trimming the ear of an animal that doesn't rely for its success on the stitching ability of the one performing the operation, and which, therefore, trims ears with consistent success and uniform results.

It is also an object of this invention to provide apparatus for and a method of trimming the ear of an animal that reduces substantially the time heretobefore required for such an operation and which produces a minimum of scar tissue along the edge of the ear that is trimmed.

These and other objects, advantages, and features of this invention will be apparent to one skilled in the art from a consideration of the specification and attached drawings.

In accordance with this invention, instead of cutting away the portion of the ear to be removed and then tying off and/or cauterizing the blood vessels and sewing together the two layers of skin on each side of the ear, the cartilage is sheared apart and the blood vessels in the connecting tissue are crushed, to stop the flow of blood to the portion of the ear to be removed, before the skin is cut. The unwanted portion of the ear then can be cut away adjacent the outside edge of the line of crushed blood vessels, which will prevent any bleeding from the cut. Usually, therefore, no stitching is required. Occasionally, however, two or three interrupted stitches are taken at the base of the ear where the cartilage is extensive and the blood vessels are numerous. As the ear heals, the crushed blood vessels and the skin on each side thereof that no longer receive any nourishment because of the crushed blood vessels, gradually atrophy and flake off the ear. During this time, the healthy skin adjacent the inside edge of the line of crushed blood vessels grows together around the edge of the sheared cartilage. Thus, the operation leaves the ear with a round and smooth edge that appears very much like the normal edge of the ear prior to trimming.

The apparatus for practicing the method of this invention comprises a pair of jaws between which the ear is pinched or squeezed. Each jaw is rounded sufficiently, as viewed in cross section, to allow sufficient pressure to be exerted on the portion of the ear between the jaws, to shear the cartilage of the ear and to crush the blood vessels in the connecting tissue without breaking the skin on either side of the ear. In the preferred embodiment of the apparatus of this invention, one of the jaws is provided with a groove that extends throughout its length to guide a knife as it cuts off the outside portion of the ear. The groove guides the knife along a line adjacent the outside edge of the line of crushed blood vessels and, usually, between the edges of the sheared or severed cartilage. Also in the preferred embodiment, the jaws are attached to hand operated pinchers.

The invention will now be described in connection with the attached drawings, in which:

FIG. 1 is a plan view of the preferred embodiment of the pinchers employed to practice this invention;

FIG. 2 is an end view of the pinchers of FIG. 1;

FIGS. 3, 4 and 5 are vertical cross-sectional views through the jaws of the pinchers of FIG. 1, showing the steps in the preferred method of trimming an ear, in accordance with this invention; and FIG. 6 is a view of the knife and jaws of FIG. 5 looking in the direction of the arrows showing the knife in the knife groove cutting away the unwanted portion of the ear.

Pinchers 10 or the "pair of pinchers," as they are often called, shown in FIG. 1 are of the double leverage type. That is, pincher arms 11 and 12 are pivotally connected together by pin 13 and pincher handles 14 and 15 are pivotally connected together by pin 16 and pivotally connected to pincher arms 11 and 12 through pins 17 and 18. Thus, pincher handles 14 and 15 provide one lever which in turn drives the other lever comprising pincher arms 11 and 12. This arrangement allows a greater compressive force to be exerted on whatever is located between elongated jaws 20 and 22 on the end of the pincher arms for a given force exerted on the pincher handles urging them together. Also, with this arrangement, the pincher handles can be provided with interengaging shoulders 23a and 23b to limit the distance the jaws can be moved toward each other. In the use to which these pinchers will be put, it is important that the predetermined minimum distance be maintained between the pinchers. Further, this type of pinchers can be arranged to lock in the closed position by having pivot pins 17 and 18 move away from the jaws beyond pivot pin 16. This is desired because it allows a uniform squeezing pressure to be applied to the ear for a period of time simply by leaving the pinchers in the locked position.

Jaws 20 and 22, preferably, are long enough to extend completely across the ear to be trimmed. In other words, when the pinchers are to be used to trim a dog's ear, preferably, the jaws are long enough for the portion of the ear to be trimmed or removed to extend entirely between the jaws. In the embodiment shown, these jaws are straight. Most ears are not cut along a straight line. The straight jaws can be used to cut along the desired curved line, however, by simply pulling the ear into position between the jaws until the curved line, along which the cut is to be made, is straight and located between the jaws. After the ear has been trimmed, the trimmed edge will assume the desired curve. If desired, the jaws can be curved in the shape desired for the particular animal's ear. To help arrange the ear in the desired position between the jaws, the pinchers are relatively "stiff," that is, they will tend to stay in the position to which they are moved. This allows the jaws to be closed on the ear sufficiently to hold it after which they can be released and the operator can use both hands to arrange the ear between the jaws as desired.

In FIGS. 3, 4 and 5, the jaws are shown in vertical cross section as they trim an animal's ear. The jaws have opposed rounded edges 20a and 22a, as viewed in cross section, to provide two relatively blunt surfaces between which the ear can be squeezed. Jaw 22 is provided with a parallel rounded surface 22b, that is spaced from surface 22a to form therebetween a groove 22c that extends the length of the jaw. This groove is provided to guide the cutting means employed to cut away the unwanted portion of the ear in a manner to be described below.

Assume, for example, it is desired to trim ear 26 along the dotted line 25, as shown in FIGS. 3–5. Ear 26 is made up of two outer layers of skin 27 and 28, a center section 29 of cartilage, and two sections 30 and 31 of connecting tissue that is located between the two outer layers of skin and the center layer of cartilage and in which are located the blood vessels (not shown) that supply the blood to the skin and cartilage of the ear.

The first step in the trimming operation is to locate the ear between the jaws so that the ear will be trimmed along the desired line. In employing the method of this invention, the jaws are located as shown in FIG. 3 adjacent to but slightly spaced from line 25 along which the ear is to be trimmed. The ear is pulled and arranged between the jaws so that line 25, which normally is a curve, is straight and spaced equidistantly from the jaws.

The next step is to squeeze the ear between rounded edges 20a and 22a of jaws 20 and 22 to sever cartilage 29 and crush the blood vessels (not shown) in connecting tissue 30 and 31. It has been found that the best results are obtained when the pinching force is held on the ear for a minimum of about two to three minutes to insure that the blood vessels are completely crushed. This can be easily accomplished with pinchers that break over center as do pinchers 10.

After this is accomplished, the pinchers can be removed and outside, unwanted, portion 26a trimmed away along a line parallel to but spaced from line 25 and adjacent the outside edge of the line of crushed blood vessels. This latter line is clearly evident after the pinchers are removed.

Or the ear can be trimmed before the pinchers are removed in the manner shown in FIGS. 5 and 6. In this way, groove 22c is employed to guide cutting means, which may be slidably mounted on the pinchers or separate therefrom, such as scalpel 32, along a line adjacent to the outside edge of the crushed blood vessels. This removes most of the unwanted portion of the ear but leaves a line of crushed blood vessels along the edge of the ear which prevents blood from flowing from the ear. Normally no cartilage will be left between the crushed blood vessels. Also, usually, the edges of the severed cartilage will be pushed apart in the manner shown in the drawings, sufficiently that scalpel 32 will pass between the edges.

After scalpel 32 has cut away portion 26a of the ear, the pincheres are removed and the operation is complete. In some instances, however, adjacent the base of the ear where the cartilage is extensive and there are many blood vessels, it is sometimes advisable to take a couple or three stitches to prevent the animal from scratching or rubbing his ear against something and breaking the seal of the crushed blood vessels at this point, which could cause the ear to bleed.

As the ear heals after the operation, the portion of the skin beneath the layer of crushed blood vessels and the connecting tissue in which the crushed blood vessels are located will gradually atrophy and scale off. As this is occurring, the outer layers of healthy skin 27 and 28 will be growing together around the end of healthy cartilage 29 substantially along dotted line 33 as shown in FIG. 5. Thus, by the time the atrophied tissue has flaked off the edge, the ear will be healed and the trimmed edge will be covered with healthy skin that will grow hair and give the edge of the ear a completely normal appearance.

From the foregoing, it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of trimming the ear of an animal comprising the steps of pinching the ear along a line adjacent to an outside of the line between the portion to be removed and the remainder of the ear to shear the cartilage between the outer layers of skin without cutting of breaking the skin and to crush the blood vessels in the connecting tissues to stop the flow of blood to the portion of the ear outside the line and cutting through the skin adjacent to the outside edge of the crushed blood vessels and between the ends of the sheared cartilage to remove the portion of the ear outside the line of crushed blood vessels.

2. A method of trimming the ear of an animal comprising the steps of positioning the ear between the jaws of a pincher along a line adjacent to and outside of the line along which it is desired to trim the ear, pinching the ear between the jaws of the pincher to shear the cartilage and crush the blood vessels between the jaws without cutting or breaking the skin, cutting away the outside portion of the ear along a line adjacent the jaws of the pinchers, and releasing the pinchers.

3. Apparatus for trimming the ear of an animal by removing a portion thereof comprising, a pair of pinchers having jaws with rounded edges as viewed in cross section means for forcing the rounded edges of the jaws toward each other to squeeze the ear therebetween sufficiently to shear the cartilage and crush the blood vessels of the ear between the jaws, and a groove in one of the jaws extending parallel to the rounded edge thereof and adjacent thereto in which a knife can be slid to cut through the ear along a line adjacent the crushed blood vessels and between the edges of the sheared cartilage.

4. Apparatus for trimming the ear of an animal, comprising, a pair of pinchers having two elongated jaws that are moved toward and away from each other by the pinchers, one jaw having a groove extending longitudinally throughout its length and a portion adjacent the groove having a convex, rounded edge, as viewed in cross section, the other jaw having a convex, rounded edge as viewed in cross section, positioned to squeeze the animal's ear between it and the rounded portion of the first-mentioned jaw as the jaws are moved together to shear the cartilage of the ear and crush the blood vessels therebetween along a line adjacent the line along which the ear is to be trimmed so that the inner edge of the crushed blood vessels coincides substantially with the line along which it is desired to trim the ear, with the groove located to guide a knife as its cuts away the ear along a line adjacent the opposite edge of crushed blood vessels.

References Cited

UNITED STATES PATENTS

| | | | |
|---|---|---|---|
| 405,642 | 6/1889 | Woodle | 128—306 |
| 1,889,333 | 11/1932 | Klipstein | 128—306 |
| 2,139,967 | 12/1938 | McCall | 128—306 |
| 2,587,966 | 3/1952 | Cleary | 128—346 |
| 2,618,268 | 11/1952 | English | 128—346 XR |

LOUIS G. MANCENE, *Primary Examiner.*

G. E. McNEILL, *Assistant Examiner.*